July 3, 1945. J. F. SEBALD 2,379,753
WATER PURIFYING AND DEGASIFYING APPARATUS
Filed July 9, 1942 3 Sheets-Sheet 1

Fig. 1.

Joseph F. Sebald
INVENTOR
BY *Rob. Meyer*
ATTORNEY

Patented July 3, 1945

2,379,753

UNITED STATES PATENT OFFICE 2,379,753

WATER PURIFYING AND DEGASIFYING APPARATUS

Joseph F. Sebald, Bloomfield, N. J., assignor to Worthington Pump and Machinery Corporation, Harrison, N. J., a corporation of Delaware Application July 9, 1942, Serial No. 450,265

25 Claims. (Cl. 210—14)

This invention relates to water treating apparatus and more particularly to an improved hot process water softener for purification of boiler feed water or water for other uses wherein heated, deaerated or degasified purified water is required.

The primary object of the present invention is to provide improved means for heating, for purifying and for deaerating or degasifying water for boiler feed or analagous purposes, which means is constructed and arranged to provide maximum heat transfer between the heating steam and the water, utilizing the steam first to heat the water which has been treated and purified. The heated purified water is degasified by its passage into an area of low pressure, while the steam which is not condensed by the heating of the treated water passes on in the apparatus to contact the incoming raw water to provide heating thereof prior to its treatment by chemicals for purification.

Among the many objects of the present invention is the provision of a novel arrangement of heating means whereby the treated water passes through a confined passageway in intimate mixing relation to the incoming steam, and the mixed stream of steam and water is broken up by suitable baffling as it enters the low pressure zone, resulting in maximum separation of released gases and air from the water. The degasified water passes on into a storage compartment from which it is drawn for use, while the non-condensed steam and released gases pass into contact with the incoming raw water where the greater portion of the steam is condensed. Any steam not condensed by heating contact with the incoming water, together with the released gases, pass into a vent condenser of the surface type wherein the incoming raw water serves as a cooling medium for condensing the steam.

Heretofore it has been an accepted practice to utilize the incoming steam to the apparatus to atomize the water, depending upon the atomizing action, to both heat and degasify the water. While such action does result in a degree of heating and degasifying of the water, it has been found by test not to remove the oxygen from the water to a degree desirable or required by the latest modern type power plant systems, wherein practically zero oxygen content of the water is required, and further it has been found by test that the intimate mixing of the steam and water in a confined passage results in a higher degree of heat transfer.

In the atomizing type of heating and purifying apparatus a pressure drop is taken in the steam to increase its velocity to provide the utilizing action for heating and degasifying the water, whereas in the present invention the heating action is provided during the confined mixed flow of steam and water, and the pressure drop is provided as the mixed stream emerges from the confined mixing passage, resulting in a greater degree of pressure drop of the heated water and consequently in a greater degree of de-gasification of the water.

Another object of the present invention is the provision of means to impart vigorous rotation to the water in the reaction settling chamber for mixing raw water and chemicals, and for building particles of precipitate of proper physical size and form so that they will readily remove themselves when the downward direction of water flow changes to horizontal and finally reverses at the entrance to the treated water uptake cone skirt. In the present invention, such vigorous rotation is imparted to the body of water being treated by the velocity of the entering water through the medium of specially arranged inlet spray valves for the water, or by passing a predetermined quantity of previously treated water through a stationary rotation imparting vane system into the body of water being treated. If so desired or required, both the novel type and arrangement of spray valve and the rotation imparting vane system may be used in a single apparatus, or, if the conditions are such, either may be used independently of the other.

The chemical liquids or reaction agent introduced into the apparatus are cooler than the water at the point of contact, in that the water has previously had its initial heating in the vent condenser and in contact with the steam as the water is sprayed into the apparatus. In some instances the introduced chemicals or reagent may represent sufficient volume to appreciably cool the water under treatment, which will interfere with the efficiency of the apparatus in that the lowering of the temperature of the water will place a higher burden of heating on the final heating and degasifying element, resulting in a decrease in the over-all efficiency of the apparatus.

It is therefore an object of the present invention to provide means so constructed and arranged that the incoming chemical liquids will be sprayed into the apparatus through the steam, thus heating the chemical liquid to the temperature of the water with which it is mixed. The heating of the chemicals has been found to facilitate their reaction with the dissolved impurities in the water being treated.

A further object of the present invention is to incorporate in a water treating apparatus a filter wash water compartment such as disclosed in United States Patent No. 2,263,398 issued November 14, 1941, and to provide an annular water storage compartment in substantially vertical alignment with the filter wash water compartment, both compartments surrounding the treating or reaction settling chamber of the apparatus, thereby permitting the provision of a compact complete unit, all embodied in a single cylindrical shell, which will be relatively economical to manufacture, will require a minimum of floor space and will prevent dissipation of heat from the water as would result from arrangement of the various compartments in independent shells or housings.

With these and other objects in view as may appear from the accompanying specification, the invention consists of various features of construction and combination of parts, which will be first described in connection wtih the accompanying drawings showing a water purifying and degasifying apparatus of the preferred form embodying the invention, and the features forming the invention will be specifically pointed out in the claims.

Referring more particularly to the drawings, the improved water purifying and degasifying apparatus comprises a treating receptacle 1, which is shown in the drawings in the form of a cylindrical shell, the bottom of which has its sides converging downwardly and inwardly toward the axis of the shell to permit the drawing off of sludge, constituting precipitated foreign material separated out of the water by the treating apparatus. Suitable valves 2, of any approved type, are provided for controlling the draining off of the sludge from the receptacle 1.

Figure 6:
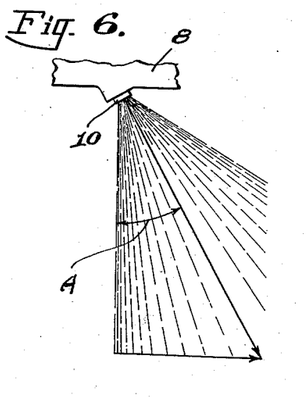
Figure 6 is a detailed view of the particular arrangement of the spray valves.
Figure 7:
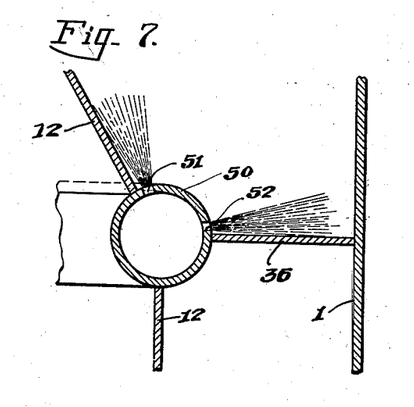
Figure 7 is a detailed sectional view of the part of the apparatus showing the construction for washing down certain partitions in the apparatus.

The raw water to be treated is supplied from any suitable source (not shown) and passes through the raw water inlet pipe 3 into the inlet 4 of the vent condenser 5. The vent condenser 5 is of the surface type, and the raw water passes through the tubes 6 of the vent condenser and out of the outlet 7 into the water ring 8. The water ring 8 is concentric of the axis of receptacle 1 and is located at the top thereof. The raw water, which of course enters the water ring 8 under pressure, is sprayed from the water ring into the initial heating portion or steam space 9 of the receptacle 1 by a plurality of spray outlets or nozzles 10 of any suitable construction. The spray outlets 10 are arranged in spaced relation about the bottom of the water ring 8, and they are inclined to the vertical, as clearly shown in Figure 6 of the drawings, so that the water sprayed therefrom will pass through the steam space 9 in an angular path, the component of angularity being shown in Figure 6 and indicated by the arrow A. The angularity of the flow of the water from the spray outlets 10 is such that the water assumes a circular path as it enters the reaction settling chamber 11, causing vigorous rotation of the water in the reaction settling chamber 11. A circular skirt 12 is carried by the top of the receptacle 1 and projects downwardly about the water ring 8 for a suitable distance to confine the multiple fine streams of water projected by the spray valves within a predetermined area and to regulate the angularity of the projected streams of water so as to provide the proper degree of rotation of the water within the settling reaction chamber 11.

The settling reaction chamber 11 is formed by a cylindrical partition 12, disposed concentric of the axis of the receptacle 1 and in extension downwardly through the receptacle 1 from the bottom of the steam space 9 to approximately the point where the bottom of the receptacle 1 begins its inward sloping for the purpose of providing a settling reaction chamber of sufficient depth to permit complete precipitation of foreign matter from the water under the action of the chemical reagent which is mixed with the water.

Figure 1:
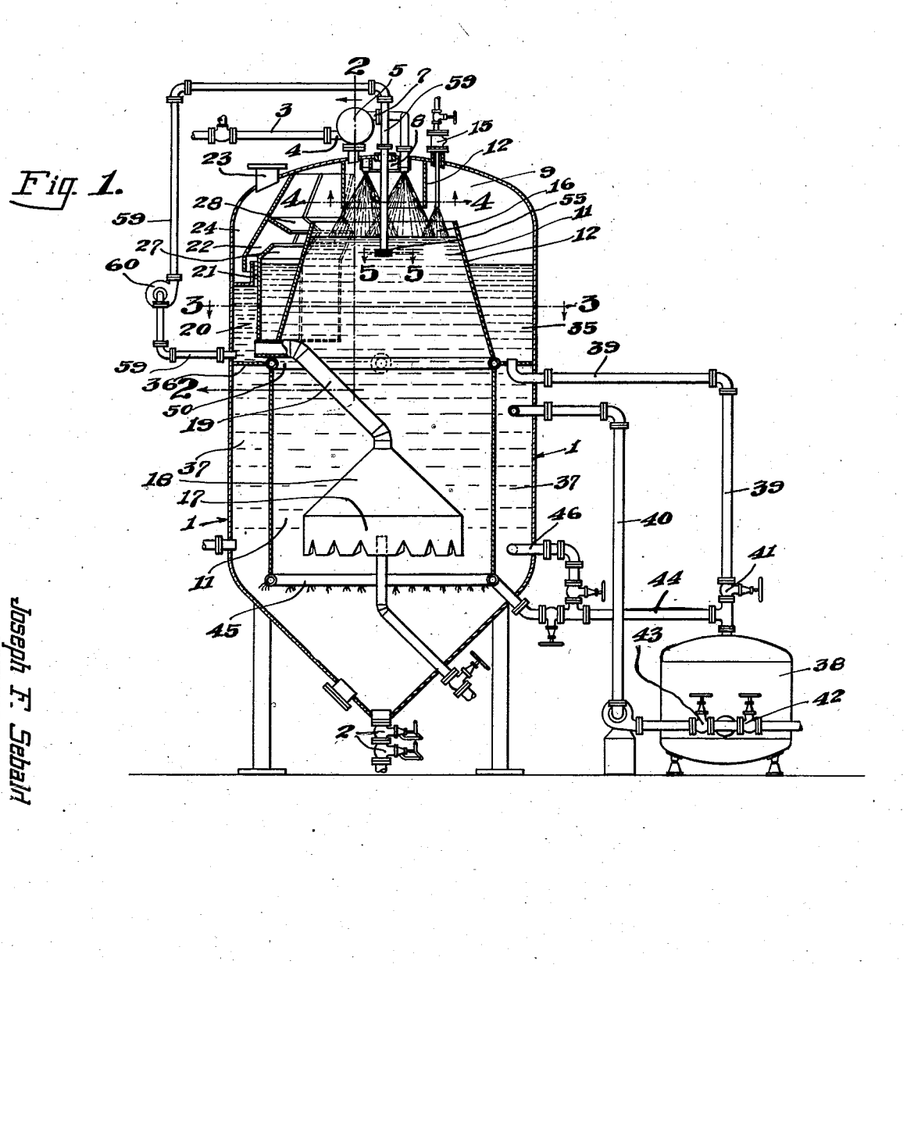
Figure 1 is a vertical section through the improved water purifying and degasifying apparatus.
Figure 2:
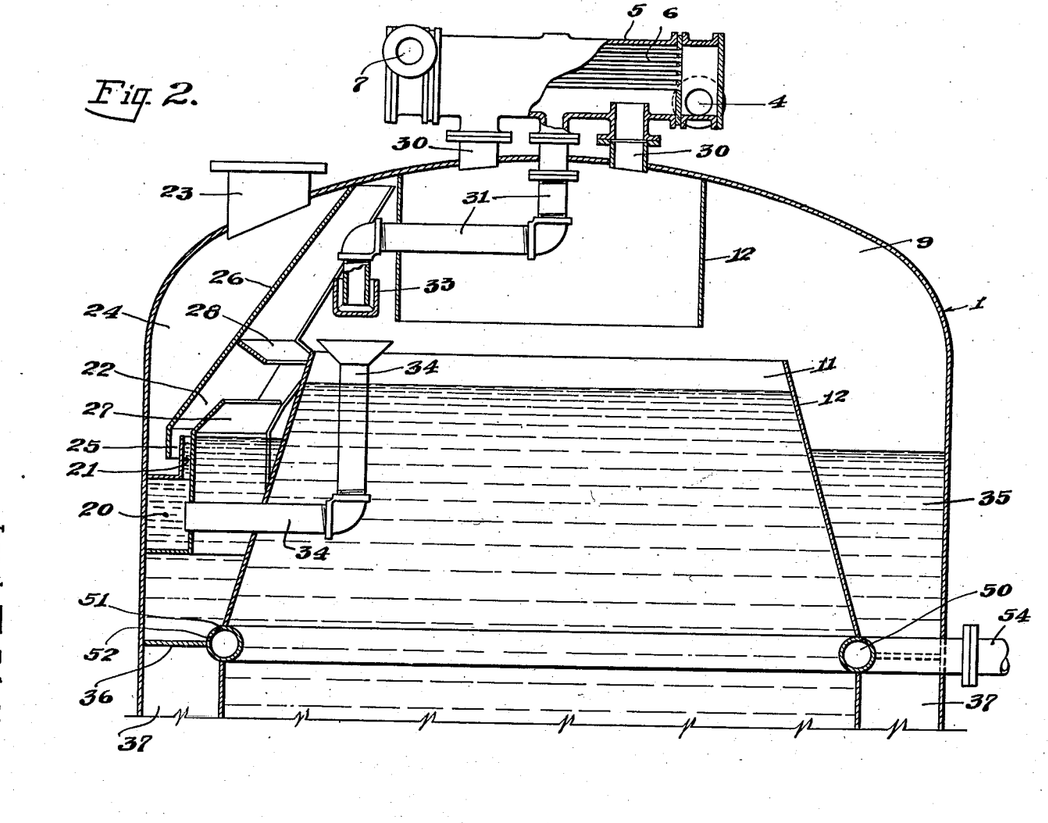
Figure 2 is a fragmentary vertical section through the apparatus taken on the line 2—2 of Figure 1.
Figure 3:
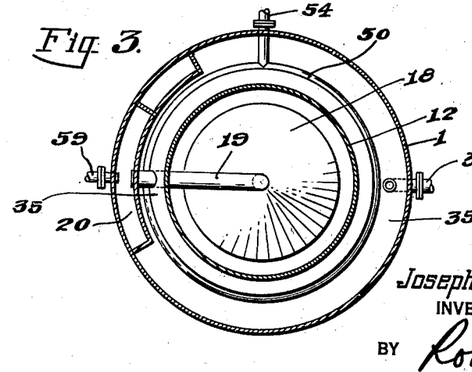
Figure 3 is a horizontal section through the apparatus taken on the line 3—3 of Figure 1.
Figure 4:
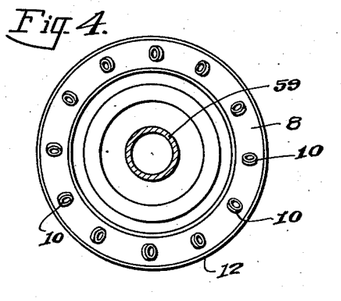
Figure 4 is a detailed horizontal section taken on the line 4—4 of Figure 1.
Figure 5:
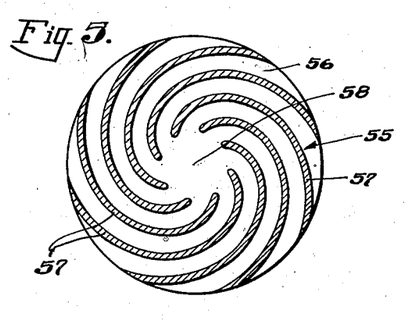
Figure 5 is a detailed horizontal section taken on the line 5—5 of Figure 1.

The chemical reagent or chemical liquids are admitted into the receptacle 1 through a novel form of nozzle 15, which is shown generally in Figure 1 of the drawings, and is described in detail in my companion application, Serial No. 430,722 filed February 13, 1942.

The chemical liquids introduced into the apparatus are colder than the water at the top of the settling reaction chamber 11 because the water has previously had its initial heating, both by heat transfer in the vent condenser 5 and by contact with steam in the steam space 9, as will be hereinafter more fully described. In some instances, such as when the water purifying and degasifying apparatus is operating with a low load demand for purified water and consequently with a reduced amount of raw water entering the apparatus, the introduced chemicals may represent sufficient volume to appreciably cool the water in the reaction chamber 11. Such cooling of the water in the settling reaction chamber will interfere with the efficiency of the apparatus in that the lowering of the temperature of the water will place a higher burden of heating on the final heated and degasified element of the apparatus (which will be hereinafter more fully described) and for this reason the chemical injection nozzle 15 is constructed and arranged so that it will spray the incoming chemical liquids into the steam space 9 and upon the top of the rotating body of water in the settling reaction chamber 11 as indicated at 16 in Figure 1 of the drawings. It has also been found that the heating of the chemicals facilitates their reaction with the dissolved impurities of the water being treated. The vigorous rotation of the water in the top of the settling reaction chamber 11 assists in and causes thorough mixing of the chemicals and the partially heated raw water.

The vigorous rotation imparted to the top area of the water in the settling reaction chamber, while gradually abating, is nevertheless maintained downwardly through the settling chamber 11. This rotating effect is very advantageous for mixing the chemicals and raw water and for building up particles of precipitate to a proper physical size and form so that they will readily remove themselves when the downward direction of water flow changes to horizontal and finally reverses at the entrance to the skirt 17 of the uptake treated water cone 18.

The chemical reaction between the applied chemicals and the impurities dissolved in the water, is practically instantaneous. Ultra-microscopic particles of solids are first formed, and the growth of these particles is greatly facilitated by the maintained rotary motion of the water as it passes downwardly through the reaction settling chamber 11 in that during such motion the particles constantly contact each other, and the size and physical properties of the precipitated particles are built up by accretion so that the particles assume sufficient weight in relation to their surface friction, causing them to settle and finally separate out during and after the reversal of the direction of flow of the water, such precipitated particles falling into the tapered bottom of the receptacle 1 from which they are drawn off at desired intervals through the valves 2. The manner of imparting rotation to the water in the reaction settling chamber 11 is such that the motion of the water is substantially a horizontal rotating one which provides the most desirable motion of the water to facilitate the proper growth and building up of the precipitation, because any other stirring action would cause general turbulence within the reaction settling chamber, and tend to upset the quiescent equilibrium so necessary for the full utilization of the entire cubical content of the reaction settling chamber 11 to insure thorough purification of the water. Another important advantage provided by the horizontal rotating motion is that the temperature across the reaction settling chamber is equalized, and no short circuiting convection currents are permitted to develop and interfere with the efficiency of operation of the apparatus and the thorough purification of the water.

The partially heated treated water rises through the uptake cone 18 and passes through the conduit 19 into the treated water receiving compartment 20 of the final heating stage of the apparatus.

The water rises through the compartment 20 and passes therefrom through the restricted passage 21 into the confined mixing passage 22. The steam utilized for heating the water in the treating apparatus enters the receptacle 1 through the steam inlet 23 and passes downwardly through the space 24, reversing its direction of flow and entering the confined mixing passage 22 through the relatively small passage 25. The confined mixing passage 22 is formed by the baffles 26 and 27, and during the flow of the steam and water through the confined mixing passage 22 the steam and water are thoroughly mixed to provide the maximum heat transfer between the steam and water. The mixed flow of steam and water passes out of the confined mixing passage 22 and is broken up by contact with the baffle 28, which extends transversely to the passage 22 and is positioned a short distance outwardly of the outlet of the confined mixing passage 22. The space 9, into which the mixed stream of steam and water is projected, is necessarily of a lower pressure than the pressure within the confined passage 22 so that as the mixed stream of steam and water is projected into this low pressure area the non-condensed steam and released gases separate out of the water or steam and pass over the top of the adjacent edge of the wall 12 of the reaction settling chamber 11 into the steam space 9, where such steam and the released gases are engaged by the fine streams of water sprayed through the steam space 9 by the spray valves 10. The contact of the sprayed water with the steam results both in condensation of a further quantity of the steam and in the initial heating of the raw water as it enters the receptacle 1. Such steam as has not been condensed by the sprays of water, together with the released gases, pass through suitable connections 30 into the vent condenser 5 about the tubes 6. The steam is condensed in the vent condenser 5, while the released gases are permitted to escape therefrom in the usual manner as provided in approved types of vent condensers. The condensate provided by the steam condensed in the vent condenser 5 passes through a suitable conduit 31, the outlet end of which opens into a weir box 33, from which it spills out in relatively thin streams through a part of the steam space 9, into a second conduit 34, which delivers a deaerated partially heated condensate into the compartment 20 for repassage through the confined mixing passage 22.

The water sprayed out by the breaking up of the stream of mixed flow of steam and water and by the pressure reduction in the chamber 9 passes over the upper edge of the baffle 27 and falls into the deaerated treated water storage space 35.

The treated water storage space 35 is an annular space within the receptacle 1 surrounding a part of the reaction settling chamber 11, and its bottom is formed by a horizontal partition 36 which divides the treated water storage space 35 from the annular filter wash water compartment 37 which surrounds the lower part of the reaction settling chamber 11.

The filter wash water compartment 37 is covered by Patent No. 2,263,398 issued November 14, 1941, and it provides a storage compartment for quiescent treated water for use in washing down the filter 38 through which the treated deaerated water passes from the treated water storage space 35, for use as is ordinary in installations employing water purification and degasification apparatus such as constitutes the present invention. The treated water passes from the storage space 35 to the filter 38 through a suitable conduit 39, and the wash water for washing the filter 38 is passed in a reverse direction through the filter 38 from the compartment 37 by a suitable conduit 40. During the washing of the filter 38 the valve 41 in the pipe or conduit 39 is closed, as is also the valve 42 in the outlet line from the filter 38, while the valve 43 in the pipe or conduit 40 is opened. The wash water is passed through the filter 38 in a reverse direction and through the piping 44, either into the sludge wash down ring 45 or back into the compartment 37 through the branch pipe 46. Wash down ring 45 sprays the returned water into the bottom part of the receptacle 1 for washing out any settled sludge which might cling to the inner surface of the walls of the receptacle 1.

A washing ring 50 is positioned within the receptacle 1 at the junction of the horizontal partition 36 and the wall 12 of the reaction settling chamber 11. This tubular ring 50 is provided with a plurality of spaced openings 51 and 52 arranged to spray cleansing water over the outer surface of the partition 12 within the treated water storage space 35 and over the top of the partition 36 respectively for the purpose of washing these surfaces to remove any sediment which might settle thereon. The ring 50 receives wash water from any suitable source through an inlet connection 54.

An alternate means is provided for imparting rotation to the water and chemicals in the reaction settling chamber, and this alternate mechanism comprises a stationary rotation imparting vane system 55, which is positioned so that it will be submerged in the water and chemicals at the top of the reaction settling chamber. The rotation imparting vane structure 55 includes suitable shrouds or vane supporting discs 56 between which a plurality of curved vanes 57 are mounted. The vanes curve outwardly from the inlet eye 58, and water passing between the vanes under pressure will be projected in a rotary path from the perimeter of the vaned element. The vaned element may be supported in any suitable manner, such as being carried by the water supply pipe 59 which delivers the rotation imparting water thereto. The supply pipe 59 is shown as having its inlet to the compartment 20 which receives the treated water immediately prior to the final stage of heating. A pump 60 of any approved type is connected in the pipe 59 for withdrawing water from the compartment 20 and delivering it under pressure to the rotation imparting vane system 55. If it is so desired, the rotation imparting vane system may be employed in a water purifying and treating apparatus in connection with the inclined spray valves for imparting rotation to the water, or it may be employed independently of the particular type and arrangement of spray valve.

It will be understood that the invention is not to be limited to the specific construction or arrangement of parts shown, but that they may be widely modified within the invention defined by the claims.

What is claimed is:

1. The method of degasifying and purifying water which consists in spraying the raw water to be treated through a steam containing space to partially heat the water, delivering the partially heated water into a reaction chamber, spraying chemicals in finely divided streams through the steam containing space, imparting vigorous rotation to the water in the reaction chamber whereby the water and the chemicals sprayed through the steam containing space will engage and be mixed with the rotating mixture in the reaction chamber for mixing, settling out the foreign matter precipitated in the reaction chamber, passing the treated purified water together with incoming steam in the same direction through a confined passage to thoroughly mix the steam and water, delivering the stream of mixed steam and water into an area of lower pressure than in the confined passage to separate out released gases, and finally delivering the heated treated degasified water into a storage compartment.

2. The method of degasifying and purifying water which consists in spraying the raw water to be treated through a steam containing space to partially heat the water, delivering the partially heated water into a reaction chamber spraying reagent chemicals in finely divided streams through the steam-containing space, heating the reagent chemical and consequently mixing the heated chemicals with the partially heated raw water in the reaction chamber, settling out the foreign matter precipitated in the reaction chamber, passing the treated purified water together with incoming steam in the same direction through a confined passage to thoroughly mix the steam and water, delivering the stream of mixed steam and water into an area of lower pressure than in the confined passage to separate out released gases, and finally delivering the heated treated degasified water into a storage compartment.

3. The method of degasifying and purifying water which consists in spraying the raw water to be treated through a steam containing space to partially heat the water, delivering the partially heated water into a reaction chamber, spraying chemicals in finely divided streams through the steam containing space to heat the chemicals, imparting vigorous rotation to the water in the reaction chamber whereby the water and the chemicals sprayed through the steam containing space will engage the rotating mixture in the reaction chamber for mixing, settling out the foreign matter precipitated in the reaction chamber, passing the treated purified water together with the steam in the same flow direction through a confined passage to thoroughly mix the steam and water and heat the water, passing the heated purified water into an area of lower pressure than in the confined passage to separate out released gases, and finally delivering the heated treated degasified water into a storage compartment, passing the non-condensed steam from said steam containing space through a surface condenser and returning the condensed steam from the condenser into the purified treated water immediately in advance of the heating thereof.

4. The method of degasifying and purifying water which consists in spraying the raw water to be treated through a steam containing space to partially heat the water, delivering the partially heated water into a reaction chamber, spraying chemicals in finely divided streams through the steam containing space, imparting vigorous rotation to the water in the reaction chamber whereby the water and the chemicals sprayed through the steam containing space will engage the rotating mixture in the reaction chamber for mixing, settling out the foreign matter precipitated in the reaction chamber, returning part of the purified treated water to the reaction chamber and injecting the returned purified water into the reaction chamber in arcuate paths and at a pressure in excess of the pressure of the water in the reaction chamber for imparting rotation to the water and chemicals in the reaction chamber, heating the remaining part of the purified treated water and passing the heated purified treated water into a low pressure area to separate out released gases, and finally delivering the heated treated degasified water into a storage compartment.

5. In a hot process water treating apparatus a treating receptacle having a reaction chamber therein, and a plurality of spray outlets for spraying water to be treated into said reaction chamber, said spray outlets being arranged at acute angles to the axis of said reaction chamber to direct the incoming sprayed water in a downwardly angular direction to cause rotation of the water in the reaction chamber in substantially horizontally rotational paths, and a skirt carried by said receptacle and extending around said spray outlets, said skirt being disposed with respect to the spray outlets to control the water sprayed from the outlets and regulate the angular component of the spray to provide the proper degree of rotation of the water in the reaction chamber.

6. In a hot process water treating apparatus a treating receptacle having a reaction chamber therein, and a plurality of spray outlets for spraying water to be treated into said reaction chamber, said spray outlets being arranged at acute angles to the axis of said reaction chamber to direct the incoming sprayed water in such manner as to cause rotation of the water in the reaction chamber in substantially horizontally rotational paths, a stationary vaned member embodying a plurality of curved vanes and being submerged in the liquid in the reaction chamber near the top thereof, and means for delivering liquid to said vaned member for discharge therethrough into the reaction chamber to impart rotation to the water in the reaction chamber.

7. In a hot process water treating apparatus, a treating receptacle having a reaction chamber therein, a plurality of spray outlets for spraying water to be treated into said reaction chamber, a steam inlet to said receptacle, said receptacle having a steam containing space therein between the spray outlets and said reaction chamber through which the water is sprayed by said spray outlets, said receptacle having a compartment therein which receives treated water from the reaction chamber, a stationary vaned member embodying a plurality of curved vanes submerged in the liquid in the reaction chamber near the top thereof, and means for delivering water from said compartment to said vaned member for discharge therethrough into the reaction chamber to impart rotation to the water in the reaction chamber.

8. In a hot process water treating apparatus, a treating receptacle having a reaction chamber therein, a plurality of spray outlets for spraying water to be treated into said reaction chamber, a steam inlet to said receptacle, said receptacle having a steam containing space therein between the spray outlets and said reaction chamber through which the water is sprayed by said spray outlets, said receptacle having a compartment therein which receives treated water from the reaction chamber, a stationary vaned member embodying a plurality of curved vanes submerged in the liquid in the reaction chamber near the top thereof, and means for delivering water from said compartment to said vaned member for discharge therethrough into the reaction chamber to impart a rotation to the water in the reaction chamber, and means for spraying reagent chemicals in finely divided streams through said steam space and into the rotating fluid in the reaction chamber whereby the chemical reagent will be heated to approximately the temperature of the water before contact therewith.

9. In a hot process water treating apparatus a treating receptacle having a reaction chamber therein, and a plurality of spray outlets for spraying water to be treated into said reaction chamber, said spray outlets being arranged at acute angles to the axis of said reaction chamber to direct the incoming sprayed water in such manner as to cause rotation of the water in the reaction chamber in substantially horizontally rotational paths, said receptacle having therein a storage space for treated purified water, a steam inlet to said receptacle, a confined mixing passage through which treated water passes from said reaction chamber to said storage space, and means for guiding steam from said steam inlet to said mixing passage for flow through the mixing passage in the same direction as the water flow therethrough for thorough mixing with the water in the passage, a stationary vaned member embodying a plurality of curved vanes submerged in the liquid in the reaction chamber near the top thereof, and means for delivering liquid to said vaned member for discharge therethrough into the reaction chamber to impart rotation to the water in the reaction chamber.

10. In a hot process water treating apparatus, a treating receptacle having a reaction chamber and a storage space for treated purified water therein, a steam inlet to said receptacle, a confined mixing passage through which treated water passes from the reaction chamber to the storage space, and means for guiding steam from said steam inlet to said mixing passage for flow through the mixing passage in the same direction as the water flow therethrough for thorough mixing with the water in the passage to heat the water, said receptacle having a steam space therein above said reaction chamber and receiving non-condensed steam from said mixing passage, means for spraying water to be treated into said reaction chamber through said steam space to partially heat the water, a stationary vaned member embodying a plurality of curved vanes submerged in the liquid in the reaction chamber near the top thereof, and means for delivering treated water to said vaned member for discharge therethrough into the reaction chamber to impart rotation to the water in the reaction chamber.

11. In a hot process water treating apparatus, a treating receptacle having a reaction chamber and a storage space for treating purified water therein, a steam inlet to said receptacle, a confined mixing passage through which treated water passes from the reaction chamber to the storage space, and means for guiding steam from said steam inlet to said mixing passage for flow through the mixing passage in the same direction as the water flow therethrough for thorough mixing with the water in the passage to heat the water, said receptacle having a steam space therein above said reaction chamber and receiving non-condensed steam from said mixing passage, means for spraying water to be treated into said reaction chamber through said steam space to partially heat the water, said receptacle having a compartment therein between said mixing passage and said reaction chamber through which the water passes from the reaction chamber to the mixing passage, said compartment communicating with said confined mixing passage and the latter communicating with said storage space, means for conveying water from the reaction chamber to the treated water compartment including a stationary vaned member embodying a plurality of curved vanes and being submerged in the liquid in the reaction chamber near the top thereof, and means for taking water from said compartment and discharging it through said vaned member into the reaction chamber to impart rotation to the water in the reaction chamber.

12. In a hot process water treating apparatus, a receptacle, an annular partition within said receptacle forming a reaction chamber, a horizontal partition in said receptacle and extending between said annular partition and the wall of said receptacle to form a filter wash water compartment and a treated water compartment in the receptacle about said annular partition, said filter wash water compartment having communication with said reaction chamber to receive water therefrom, inlet means for delivering water from said reaction chamber to said treated water chamber, means for delivering water to be treated to said reaction chamber, and outlet means for water in said treated water chamber.

13. In a hot process water treating apparatus, a receptacle, an annular partition within said receptacle forming a reaction chamber, a horizontal partition in said receptacle outwardly of and around said annular partition forming a filter wash water compartment and a treated water compartment in the receptacle about said annular partition, said filter wash water compartment having communication with said reaction chamber to receive water therefrom, inlet means for delivering water from said reaction chamber to said treated water chamber, means for delivering water to be treated to said reaction chamber, outlet means for water in said treated water chamber, and means for spraying jets of cleansing fluid over said horizontal partition and over a part of said cylindrical partition.

14. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means for withdrawing part of the water from said communicating compartment and returning it to said reaction chamber, means for delivering water to be treated to said reaction chamber, and outlet means for treated water communicating with said treated water chamber.

15. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means for withdrawing part of the water from said communicating compartment and returning it to said reaction chamber, means for delivering water to be treated to said reaction chamber, outlet means for treated water communicating with said treated water chamber, and means for imparting rotary movement to the water returned to the reaction chamber from said communicating compartment for imparting rotary movement to the water delivered to the reaction chamber by said inlet means.

16. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle, a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, means for delivering water to be treated to said reaction chamber, and outlet means for water having communication with said treated water chamber.

17. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle, a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, said receptacle having a steam space therein above said reaction chamber, said steam space having communication with said restricted passage for receiving residual steam from the restricted passage, means for spraying water to be treated through said steam space into said reaction chamber, means for spraying chemical reagents in finely divided streams through said steam space into said reaction chamber, and outlet means for treated water communicating with said treated water chamber.

18. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle, a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, said receptacle having a steam space therein above said reaction chamber, said steam space having communication with said restricted passage for receiving residual steam from the restricted passage, means for spraying water to be treated through said steam space into said reaction chamber, means for spraying chemical reagents in finely divided streams through said steam space into said reaction chamber, outlet means for treated water communicating with said treated water chamber, and means for withdrawing part of the water from said communicating compartment and returning it to said reaction chamber.

19. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, said receptacle having a steam space therein above said reaction chamber, said steam space having communication with said restricted passage for receiving residual steam from the restricted passage, means for spraying water to be treated through said steam space into said reaction chamber, means for spraying chemical reagents in finely divided streams through said steam space into said reaction chamber, outlet means for treated water communicating with said treated water chamber, means for withdrawing part of the water from said communicating compartment and returning it to said reaction chamber, and means for imparting rotary movement to the water returned to the reaction chamber from said communicating compartment for imparting rotary movement to the water delivered to the reaction compartment by said spraying means.

20. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, means for delivering water to be treated to said reaction chamber, and outlet means for water having communication with said treated water chamber, and means for spraying jets of cleansing fluid over said horizontal partition and a part of said cylindrical partition.

21. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle a steam inlet in said receptacle opening into said steam inlet space, means forming a restricted passage in the receptacle having inlet communication with said communicating compartment and steam inlet space and outlet communication with the treated water compartment whereby steam and water will flow in the same direction through said restricted passage to thoroughly mix the steam and water, spray outlets for spraying water to be treated into said reaction chamber, said spray outlets being arranged at acute angles to the axis of the reaction chamber to direct the incoming sprayed water in a downwardly angular direction to cause rotation of the water in the reaction chamber, and outlet means for treated water having communication with said treated water chamber.

22. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle, means forming a restricted passage in the receptacle having inlet communication with said communicating compartment and steam inlet space and outlet communication with the treated water compartment whereby steam and water will flow in the same direction through said restricted passage to thoroughly mix the steam and water, spray outlets for spraying water to be treated into said reaction chamber, said spray outlets being arranged at acute angles to the axis of the reaction chamber to direct the incoming sprayed water in a downwardly angular direction to cause rotation of the water in the reaction chamber, and outlet means for treated water having communication with said treated water chamber, said receptacle having a steam space therein above said reaction chamber and having communication with the outlet of said restricted passage to receive residual steam therefrom, said spray outlets arranged to project the incoming water through said steam space, and means for spraying chemical reagents in finely divided streams through said steam space into said reaction chamber.

23. In a hot process water treating apparatus, a receptacle, an annular partition within said receptacle forming a reaction chamber, a horizontal partition in said receptacle outwardly of said annular partition and forming a treated water compartment in the receptacle about said annular partition, means forming a communicating compartment through which water passes from said reaction chamber to said treated water compartment, means forming a steam inlet space in said receptacle, means forming a restricted passage in the receptacle having inlet communication with said communicating compartment and steam inlet space and outlet communication with the treated water compartment whereby steam and water will flow in the same direction through said restricted passage to thoroughly mix the steam and water, means for delivering water to be treated to said reaction chamber, outlet means for water having communication with said treated water chamber, and means at the outlet of said restricted passage for breaking up the mixed flow of steam and water.

24. In a hot process water treating apparatus, a treating receptacle having a reaction chamber and a storage space for treated purified water therein, a steam inlet to said receptacle, a confined mixing passage in said receptacle through which treated water passes from the reaction chamber to the storage space, means for guiding steam from the steam inlet to said mixing passage for flow through the passage in the same direction as the water flow therethrough for thoroughly mixing the steam and water in the mixing passage to heat the water, said receptacle having a steam space therein above said reaction chamber and receiving residual steam from said mixing passage, a plurality of spray outlets at the top of said steam space and arranged at acute angles to the axis of said reaction chamber for spraying incoming water to be treated in a downward angular direction through said steam space in a flow direction across the flow direction of steam into the steam space and to cause rotation of the water in the reaction chamber in substantially horizontally rotational paths.

25. In a hot process water treating apparatus, a treating receptacle having a reaction chamber and a storage space for treated purified water therein, a steam inlet to said receptacle, a confined mixing passage in said receptacle through which treated water passes from the reaction chamber to the storage space, means for guiding steam from the steam inlet to said mixing passage for flow through the passage in the same direction as the water flow therethrough for thoroughly mixing the steam and water in the mixing passage to heat the water, said receptacle having a steam space therein above said reaction chamber and receiving residual steam from said mixing passage, a plurality of spray outlets at the top of said steam space and arranged at acute angles to the axis of said reaction chamber for spraying incoming water to be treated in a downward angular direction through said steam space in a flow direction across the flow direction of steam into the steam space and to cause rotation of the water in the reaction chamber in substantially horizontally rotational paths, and means in the path of the steam and water leaving said confined mixing passage for breaking up the mixed flow of steam and water and directing the water to said storage space.

JOSEPH F. SEBALD.